May 17, 1949.  S. N. WEKEMAN  2,470,277

OPTICAL LENS UNIT WITH IMAGE REVERSING MEANS

Filed Oct. 25, 1946  2 Sheets-Sheet 1

INVENTOR
STEPHEN N. WEKEMAN.
BY Ward Crosby and
his ATTORNEYS.

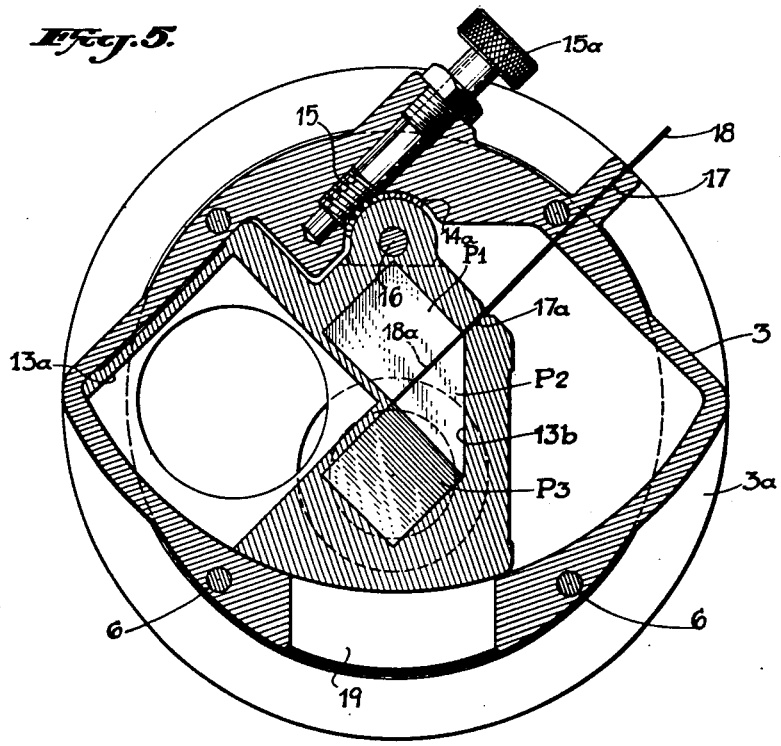
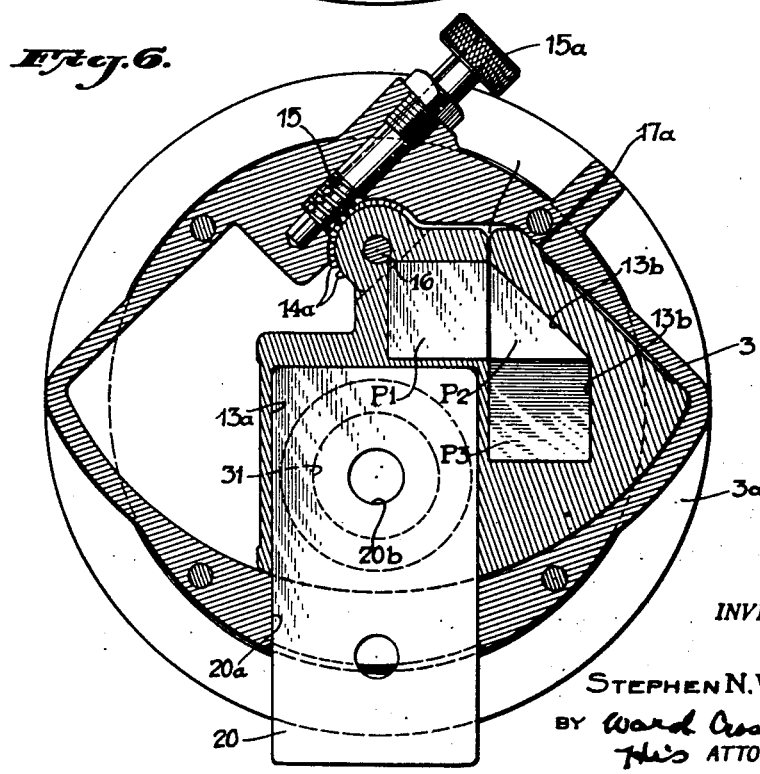

Patented May 17, 1949

2,470,277

UNITED STATES PATENT OFFICE 2,470,277

OPTICAL LENS UNIT WITH IMAGE REVERSING MEANS

Stephen N. Wekeman, Saddle River Township, Bergen County, N. J., assignor to Sun Chemical Corporation, New York, N. Y., a corporation of Delaware Application October 25, 1946, Serial No. 705,627

5 Claims. (Cl. 88—57)

1

This invention relates to a lens unit for selectively projecting either a normal or a reversed image. The invention is especially useful in optically transferring an image from a copy sheet onto a photo-sensitive surface for producing on the latter an image appearing on the copy sheet, which may be either a positive or a negative.

An object of the invention is to provide a unitary device which may be readily adjusted for use in projecting an image either in the usual or normal manner, or reversing the same.

Another object of the invention is to provide a device of improved design which is compact and rugged, facilitating manufacture, mounting and servicing.

Other features and advantages of the device will be apparent from the following description considered in connection with the drawings in which.

Figure 1:
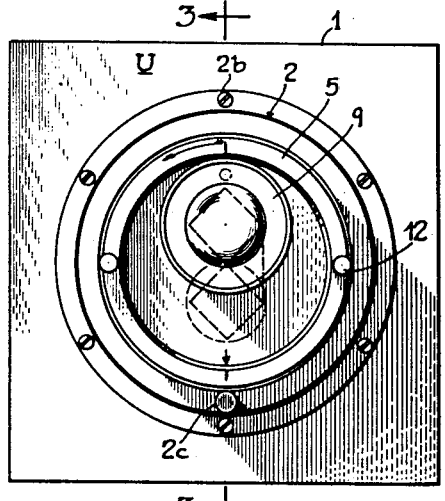
Fig. 1 is a front elevational view showing an embodiment of the invention with the parts adjusted for projection of a reversed image.
Figure 2:
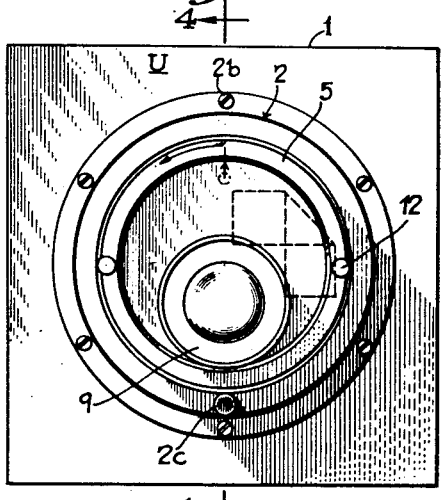
Fig. 2 is a similar view, but showing the parts adjusted for normal projection of an image.
Figure 3:
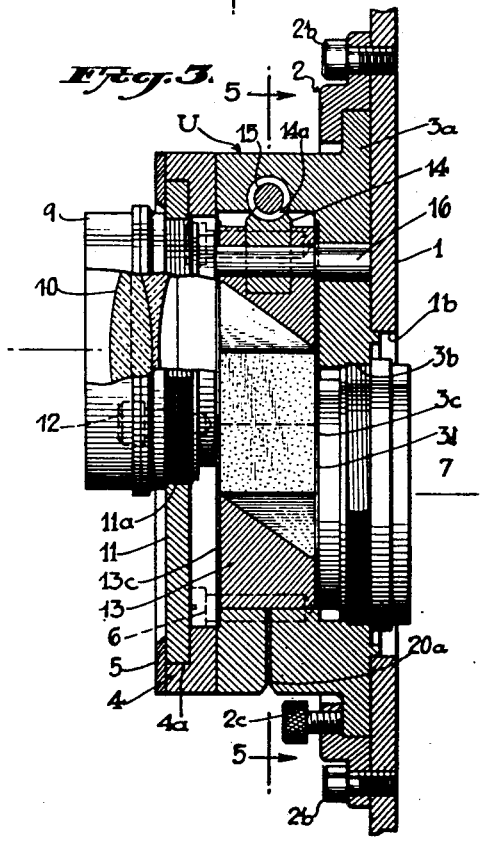
Fig. 3 is a longitudinal sectional view taken on the line 3—3 of Fig. 1 in the direction indicated.
Figure 4:
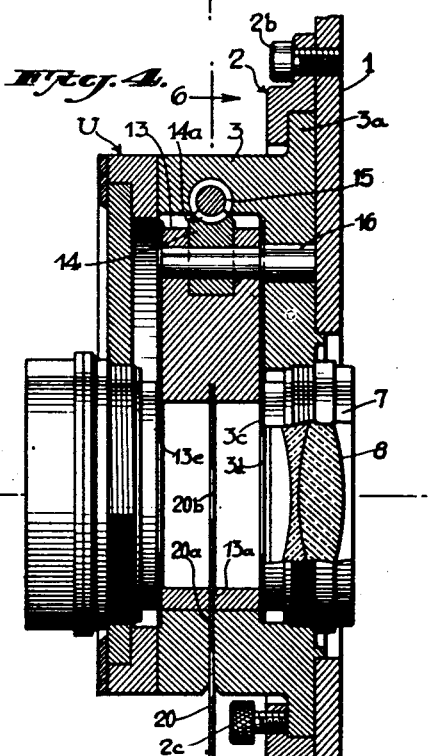
Fig. 4 is a longitudinal sectional view taken on the line 3—3 of Fig. 2 in the direction indicated.

Fig. 5 is a cross-sectional view of the device in the adjusted position shown in Figs. 1 and 3 and taken along the line 3—3 of Fig. 3; and Fig. 6 is a cross-sectional view of the device in the adjusted position shown in Figs. 2 and 4 and taken along the line 4—4 of Fig. 4.

In accordance with the present embodiment of my invention, a photographic unit, designated in general as U, comprises in general a pair of sets or lens elements, which form an objective lens adapted to project what may be termed a normal or non-reversal projected image, and a prism set, or equivalent, adapted to be disposed at will either in or out of the optical path of said objective lens, said prism set being constructed and arranged to effect a reversal of said image. When said prism means is disposed in the optical path of said objective the image is reversed about one axis by said prism means, so that the ultimate image of the copy is reversed only about the other axis; whereas, when said prism means is disposed out of the optical path a normal image of the copy sheet is produced which is reversed about both the horizontal and vertical axes.

Referring to the drawings and more particularly to Figs. 1 and 2, 1 represents any suitable mounting plate adapted to be detachably secured to the lens board of a camera. Suitably secured to the plate 1, as by fastening means designated generally as 2, is a housing 3 which comprises an end wall 3a disposed in engagement with the plate 1 and having a passage 3b aligned with a cooperating passage 1b of said plate 1. Preferably the fastening means 2 is such as to provide for angular adjustment or setting of the housing 3 with respect to the plate 1. A suitable means to accomplish this comprises a ring flange 2a rigidly secured to the plate 1 as by screws 2b and provided with an inwardly extending circular flange spaced from the plate 1 so as to provide therewith a circular groove or recess in which is disposed a cooperating circular flange integral with and extending outwardly from the housing end wall 3a. One or more clamp screws 2c serve to hold the housing 3 in desired adjusted position. Disposed flatwise against the housing 3 is an annular member 4 to which is suitably secured an outer ring 5, as by means of screws 6 which extend through the annular member 4 and are threaded into the housing 3 so as to hold member 4 and its attached ring 5 in assembled relation in fixed position on the housing 3. The annular member 4 is so shaped that the ring 5 cooperates therewith to form a circular groove 4a, Figs. 3 and 4, to provide for angular movement of the member 4 for purposes to be hereinafter described.

Threaded into the passage 3b of the housing 3 is a lens casing 7 in which is held an apochromatic set or lens element 8. In a generally similar manner, a lens casing 9, holding an apochromatic set or lens element 10, is threaded into an opening 11a of a mounting plate 11 which is rotatably disposed in the aforesaid groove 4a. The lens elements 8 and 10 together provide an objective lens adapted to project a normal or non-reversed image. The plate 11 may carry one or more engageable members 12 whose inner shank ends are removably seated in registering recesses provided in the plate 4. The members 12 provide a means for moving and adjustably securing said plate 11 in different angular positions in the annular guideway 4a for a purpose hereinafter described.

An opaque plate 3c is suitably secured to the interior of the wall 3a and is provided with an aperture or opening 3d fixedly aligned with the openings 3b and 1b.

Disposed within the housing 3 is a casing 13 which comprises an upper bifurcation in which is received and rigidly secured a worm wheel segment 14 having teeth 14a (Fig. 6) in meshing engagement with cooperating teeth of a worm 15; said worm 15 being suitably journaled in the housing 3 and having an enlarged engageable end 15a arranged for manual actuation. The casing 13 is mounted for free pivotal movement about the axis of a pin 16 carried by the housing 3. The casing 13 comprises a passage or opening 13a extending entirely therethrough for the purpose to be described hereinafter. Said housing 13 also comprises a chamber 13b in which three prisms P1, P2 and P3 are received, these prisms being secured in their respective intended positions in any suitable manner, and such prism set providing a suitable means for optically reversing an image passed therethrough.

An opaque plate 13c is suitably secured to the casing or prism set holder 13 for movement therewith and is provided with a first aperture or opening 13d (Fig. 3) and a second aperture or opening 13e (Fig. 4) each alternately movable into or out of one of two optical paths, in the manner and for the purposes to be described.

A slot 17 (Fig. 5) is provided in the housing 3 and a cooperating slot 17a is provided in the holder 13 and when the parts are in the adjusted position shown in Fig. 5 these slots jointly provide a guideway for a stop plate 18 in which is disposed an iris aperture of desired size, such as 18a. Similarly a slot 19 is provided in the housing 3 and a cooperating slot 20a (Figs. 4 and 6) is provided in the holder 13 so that when the parts are in the adjusted position shown in Fig. 6 the slots 20 and 20a jointly provide a guideway for a stop plate 20 in which is disposed an iris aperture of desired size, such as 20b.

My invention is adapted to function in either of the two ways described following:

(1) With the parts positioned as shown in Figs. 1, 3 and 5, the device serves as a reversing unit, i. e., instead of the projected image being reversed about both the horizontal and vertical axes, as effected by the usual projection, the resultant image is reversed about one axis only— depending upon the adjusted angular setting of the entire unit relative to the plate 1. My pending application Serial No. 545,090, filed July 15, 1944, and which has become Patent No. 2,434,378, dated January 13, 1948, may be referred to for further details of the prism set P1, P2 and P3 relative to the offset lens sets 8 and 10 in this position of adjustment.

(2) With the parts positioned as shown in Figs. 2, 4 and 6, the device serves as the customary photographic projector unit which, as between the original copy image and ground glass plate, effects an image reversal about both the horizontal and vertical axes.

Operation

Assuming the plate 1 to be mounted between a copy sheet (disposed to the left of Fig. 3) and a photo-sensitized surface (disposed to the right of Fig. 3); with the parts disposed as shown in Figs. 1, 3 and 5 the axes of lenses 10 and 8 will be offset and (Fig. 3) the reversing prism set P1—P3 will be disposed in the optical path in series with the lens sets 10 and 8 (Fig. 5), with the aperture 13d in plate 13c interposed between lens 10 and prism P1 and the iris opening 18a in plate 18 (Fig. 5) in optical register. Light rays, suitably reflected from the copy sheet, will pass inwardly through the lens 10 and reversing set P1—P3 and then outwardly through the lens 8 and will be projected onto the sensitized surface in said reverse position.

If, however, it is desired to project a normal or non-reversed image from a similarly disposed copy sheet onto a similarly disposed sensitized surface the device is adjusted as follows: The operator withdraws the members 12 (Figs. 1 and 3) and rotates the plate 11 in the direction of the arrow (Fig. 1) 180 degrees and then reseats the members 12 in their respective recesses in plate 4, this brings the lenses 10 and 8 into coaxial alignment (Figs. 2 and 4). Then the operator removes the stop plate 18 and by means of the head 15a rotates the worm 15 to thereby swing the holder 13 in an anti-clockwise direction to the position shown in Fig. 6. This removes the prism set P1—P3 outside the optical path and simultaneously moves the opening 13a and aperture 13e (Fig. 4) into registration with the lenses 10 and 8, and a suitable stop plate 20 is inserted in the passages 19 and 13a to provide the desired iris opening. Now when light rays are reflected from the copy sheet they pass directly through the objective lenses 10 and 8 and a non-reversed image is projected onto the sensitized surface.

Having thus described my invention with particularity with reference to preferred forms, and having described and referred to certain modifications, it will be obvious to those skilled in the art, after understanding my invention, that various changes and other modifications may be made therein without departing from the spirit and scope of my invention, and I aim in the appended claims to cover such changes and modifications as are within the scope of the invention.

What I claim is:

1. An optical unit for normal and reversed image projection comprising in combination, a pair of objective lenses disposed on respective parallel axes and spaced apart in an axial direction, means for mounting said lenses for relative movement into coaxial alignment and out of coaxial alignment a predetermined offset distance, and an image reversing prism set disposed in the space between said lenses, means for adjustably mounting said image reversing prism set for movement into and out of the optical path through said objective, said prism set having parallel entrance and exit axes spaced apart said predetermined distance, whereby said lenses may be selectively disposed in offset relation with said prism set interposed in the optical path to thereby produce a reversed projected image or in coaxial alignment with said prism set removed from the optical path to thereby produce a normal projected image.

2. An optical unit for normal and reversed image projection comprising in combination, a pair of apochromatic objective lenses disposed on respective parallel axes and spaced apart in an axial direction, means for mounting said lenses for relative movement into coaxial alignment and out of coaxial alignment a predetermined offset distance less than the diameter of one of said lenses, and an image reversing prism set comprising three right angle prisms disposed in the space between said lenses, a movable holder for positioning said prism set into and out of the optical path through said objective, said prism set having parallel entrance and exit axes spaced apart said predetermined offset distance, whereby said lenses may be selectively disposed in offset relation with said prism set interposed in the optical path to thereby produce a projected image reversed about one axis only in coaxial alignment with said prism set removed from the optical path to thereby produce a projected image reversed about both axes.

3. An optical unit for normal and reversed image projection comprising in combination, a first objective lens element mounted in said housing, a second objective lens element mounted in said housing in axial spaced relation to said first lens element, said mounting providing means for relative movement between said lens elements in a direction normal to their optical axes while maintaining said axes in parallel relation to thereby provide for selectively positioning said lens elements in coaxial or offset axial positions, an image reversing unit, a holder disposed in said housing and movably supporting said reversing unit to thereby provide for selectively positioning said reversing unit within or without the optical path of said first and second lens elements, whereby said reversing unit may be selectively disposed within the path of said lens elements when the latter are in offset position to produce a reversed image projection or without the optical path of said lens elements when the latter are in coaxial position to produce a normal image projection.

4. An optical unit for normal and reversed image projection comprising in combination, a first objective lens element mounted in said housing about a fixed axis, a second objective lens element adjustably mounted in said housing in axial spaced relation to said first lens element for movement of its axis selectively out of and into coaxial relationship with respect to the axis of said first lens element, an image reversing prism set, means for adjustably mounting said image reversing prism set in said housing for movement into and out of the optical path of said lens elements to thereby provide for selectively positioning said reversing unit within or without the optical path of said first and second lens elements, whereby said reversing unit may be disposed within the path of said lens elements when the latter are in offset position to produce a reversed image projection and said reversing element may be disposed without the optical path of said lens elements when the latter are in coaxial position to produce normal image projection.

5. An optical unit for normal and reversed image projection comprising in combination, a first objective lens element mounted in said housing about a fixed axis, a second objective lens element adjustably mounted in said housing in axial spaced relation to said first lens element for movement of its axis selectively out of and into coaxial relationship with respect to the axis of said first lens element, an image reversing prism set, a holder for said prism set pivotally mounted in said housing, adjusting means for moving said holder and prism set into and out of the optical path of said lens elements to thereby provide for selectively positioning said reversing unit within or without the optical path of said first and second lens elements, a diaphragm carried by and movable with said holder and provided with a first aperture for cooperative relation intermediate said second lens element, a first guideway provided jointly in said housing and holder for positioning a first stop plate in the optical path of said prism set and a second guideway provided jointly in said housing and holder for positioning a second stop plate in the optical path of said objective lens whereby said reversing unit may be disposed within the path of said lens elements when the latter are in offset position to produce a reversed image projection and said reversing element may be disposed without the optical path of said lens elements when the latter are in coaxial position to produce normal image projection.

STEPHEN N. WEKEMAN.

REFERENCES CITED

The following references are of record in the file of this patent:

UNITED STATES PATENTS

| Number | Name | Date |
|---|---|---|
| 2,019,234 | Nistri | Oct. 29, 1935 |
| 2,085,050 | Stout | June 29, 1937 |
| 2,137,570 | Gilmore | Nov. 22, 1938 |
| 2,257,551 | Griffin et al. | Sept. 30, 1941 |
| 2,280,989 | Welch | Apr. 28, 1942 |

FOREIGN PATENTS

| Number | Country | Date |
|---|---|---|
| 322 | Great Britain | 1905 |
| 388,415 | France | May 30, 1908 |
| 313,322 | Great Britain | June 13, 1929 |
| 330,310 | Great Britain | June 12, 1930 |